UNITED STATES PATENT OFFICE.

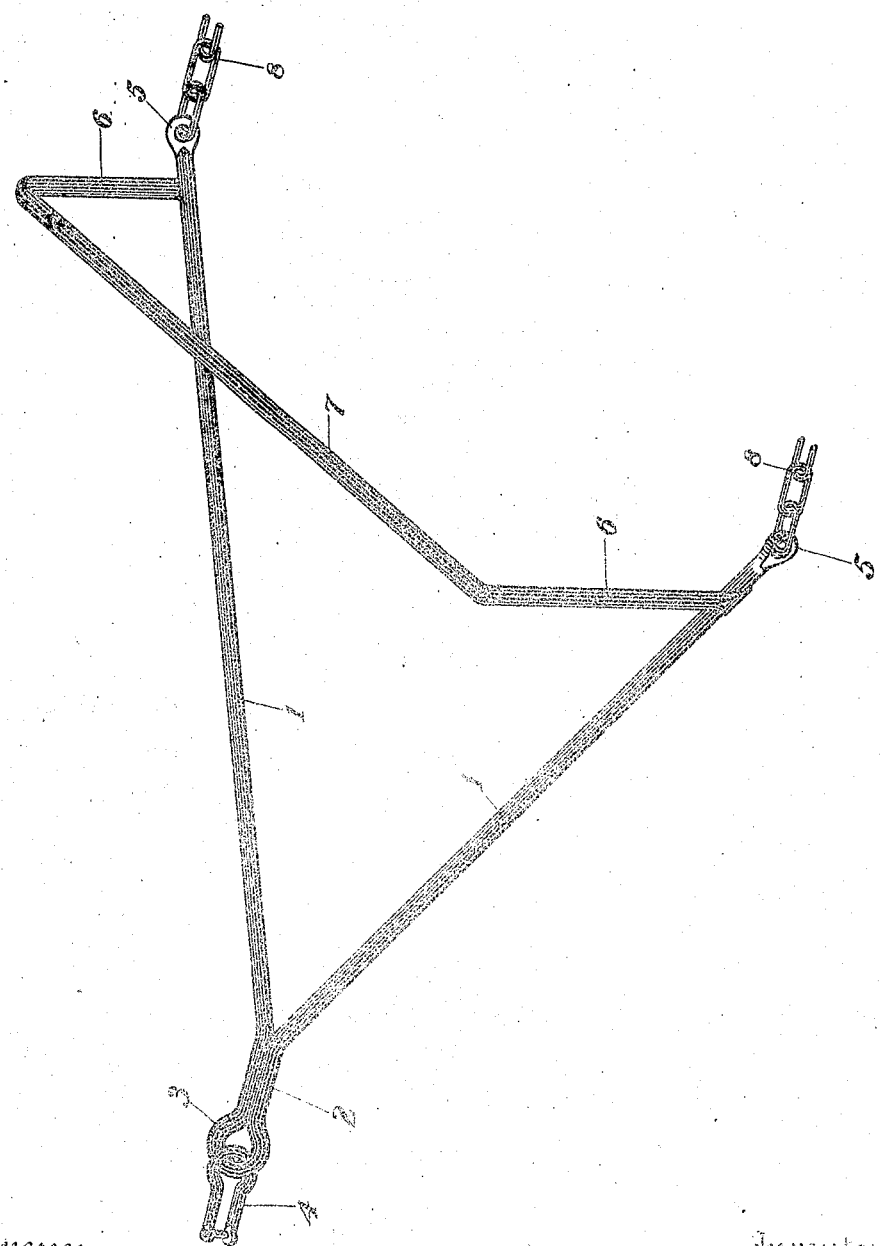

WILLIAM E. FORWOOD, OF LODI, CALIFORNIA.

SWINGLETREE.

No. 918,840.  Specification of Letters Patent.  Patented April 20, 1909.

Application filed March 24, 1908. Serial No. 422,878.

*To all whom it may concern:*

Be it known that I, WILLIAM E. FORWOOD, a citizen of the United States, residing at Lodi, in the county of San Joaquin and State of California, have invented certain new and useful Improvements in Swingletrees; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farming implements and particularly to swingletrees used in connection with cultivators and harrows used in vineyards and similar places, the object of the invention being to produce a swingletree so constructed and operated as to be held continuously away from the vines, thereby avoiding the breakage and bruising of said vines, which is now so often done, thus causing a great loss. Also to provide a simple and effective device for the purpose. These objects I accomplish by means of a substantially V-shaped swingletree connecting at its lower end with the implement and the upper ends being provided with a suitable cross brace member and with such other and further construction as will appear by a perusal of the following specification and claim.

In the drawing similar characters of reference indicate corresponding parts in the view.

The figure in the drawing is a perspective view of the complete device.

Referring more particularly to the characters of reference on the drawings 1 designates the swingletree proper which is substantially V shaped and provided at its lower end with an arm or shank 2 at the lower end of which is formed a ring 3 for receiving the usual clevis 4.

The upper ends of the member 1 are formed with vertical rings 5 for receiving the usual butt chains 8. Near the ends 5 are upwardly extending rods 6 provided at their upper ends with a cross brace bar 7.

In practice it is impossible for this swingletree to break or bruise the vines since the part 2 and the lower end of the V-shaped member 1, which are the lowest parts, are not of sufficient width to come near the vines, while the upper ends of said member 1 are held up near the body of the horse by the chains 8 and being thus above the vines, the smooth tapering sides of the member 1 preventing the same from breaking the vines even should they strike them, which is almost impossible for the reasons set forth.

The brace member 7 prevents the outer ends of the member 1 from pulling together with the necessary strain on them, and said brace member is held upward as described to permit of there being sufficient space for the horse's hind legs to move in.

The main features of novelty which I claim for the swingletree just described are the narrow shank 2 and the V-shape of the member 1 outward therefrom which brings the lowest parts farthest from the vines and still has an upper width sufficient for the purpose of hitching etc.

From the foregoing description it will be be seen that I have produced a device which substantially fulfils all the the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A swingletree comprising the combination of a V shaped member, an elongated rigid shank formed at its lower end, a ring secured to the lower end of said shank, projecting upright members secured near the outer ends of said V shaped member, a cross member secured to said upright members and transversely with respect to said V shaped member, and vertical rings formed in the outer ends of said V shaped members, as set forth.

In testimony whereof I affix my signature in presence of two witnesses.

WILLIAM E. FORWOOD.

Witnesses:
PERCY S. WEBSTER,
FRANK H. CARTER.